(12) United States Patent
Shimozawa

(10) Patent No.: US 10,274,024 B2
(45) Date of Patent: Apr. 30, 2019

(54) DUAL CLUTCH APPARATUS

(71) Applicant: ISUZU MOTORS LIMITED, Tokyo (JP)

(72) Inventor: Tomoaki Shimozawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 147 days.

(21) Appl. No.: 15/535,003

(22) PCT Filed: Dec. 11, 2015

(86) PCT No.: PCT/JP2015/084836
§ 371 (c)(1),
(2) Date: Jun. 9, 2017

(87) PCT Pub. No.: WO2016/093353
PCT Pub. Date: Jun. 16, 2016

(65) Prior Publication Data
US 2017/0321764 A1 Nov. 9, 2017

(30) Foreign Application Priority Data
Dec. 11, 2014 (JP) .................. 2014-250906

(51) Int. Cl.
*F16D 25/10* (2006.01)
*F16H 59/42* (2006.01)
(Continued)

(52) U.S. Cl.
CPC ............. *F16D 25/10* (2013.01); *F16D 21/06* (2013.01); *F16D 25/0638* (2013.01);
(Continued)

(58) Field of Classification Search
None
See application file for complete search history.

(56) References Cited

U.S. PATENT DOCUMENTS

| 2003/0116396 A1 | 6/2003 | Kuhstrebe |
| 2010/0162840 A1 | 7/2010 | Gitt |

(Continued)

FOREIGN PATENT DOCUMENTS

| CN | 102032339 A | 4/2011 |
| CN | 103228961 A | 7/2013 |

(Continued)

OTHER PUBLICATIONS

First Office Action for related CN App No. 201580067152.6 dated Sep. 5, 2018, 10 pages.

(Continued)

*Primary Examiner* — Timothy Hannon
(74) *Attorney, Agent, or Firm* — Procopio, Cory, Hargreaves & Savitch LLP

(57) ABSTRACT

A dual clutch device is provided with a first piston for engaging a first clutch by using hydraulic pressure supplied to a first hydraulic chamber and disengaging the first clutch by using a first spring, a second piston for engaging a second clutch by using hydraulic pressure supplied to a second hydraulic chamber and disengaging the second clutch by using a second spring, first supply lines for supplying hydraulic pressure to the first hydraulic chamber and a second hydraulic canceling chamber, second supply lines for supplying hydraulic pressure to the second hydraulic chamber and a first hydraulic canceling chamber, a first valve for allowing or blocking the hydraulic pressure supply to the first hydraulic chamber and the second hydraulic canceling chamber, and a second valve for allowing or blocking the hydraulic pressure supply to the second hydraulic chamber and the first hydraulic canceling chamber.

4 Claims, 9 Drawing Sheets

(51) Int. Cl.
  *F16H 61/00* (2006.01)
  *F16H 61/02* (2006.01)
  *F16D 48/02* (2006.01)
  *F16D 25/0638* (2006.01)
  *F16D 21/06* (2006.01)

(52) U.S. Cl.
  CPC ......... *F16D 48/02* (2013.01); *F16D 48/0206* (2013.01); *F16H 59/42* (2013.01); *F16H 61/00* (2013.01); *F16H 61/02* (2013.01); *F16D 2021/0653* (2013.01); *F16D 2021/0661* (2013.01); *F16D 2048/0266* (2013.01); *F16D 2048/0269* (2013.01); *F16D 2500/1026* (2013.01); *F16D 2500/1027* (2013.01); *F16D 2500/1045* (2013.01); *F16D 2500/10412* (2013.01); *F16D 2500/30816* (2013.01); *F16D 2500/3166* (2013.01); *F16D 2500/70406* (2013.01)

(56) References Cited

U.S. PATENT DOCUMENTS

| | | |
|---|---|---|
| 2011/0077122 A1 | 3/2011 | Lundberg et al. |
| 2013/0190134 A1* | 7/2013 | Mair ..................... F16H 61/688 477/86 |
| 2014/0209424 A1 | 7/2014 | Kim |
| 2016/0290482 A1* | 10/2016 | Herkommer ........ F16H 57/0436 |

FOREIGN PATENT DOCUMENTS

| | | |
|---|---|---|
| CN | 103382970 A | 11/2013 |
| CN | 103797263 A | 5/2014 |
| CN | 103836091 A | 6/2014 |
| CN | 104040205 A | 9/2014 |
| EP | 0779454 | 6/1997 |
| EP | 3133310 A1 | 2/2017 |
| JP | 2004-036807 A | 2/2002 |
| JP | 2010-531417 A | 9/2010 |
| JP | 2013-024331 A | 2/2013 |
| WO | 2015159955 A1 | 10/2015 |

OTHER PUBLICATIONS

International Search Report and Written Opinion for PCT App No. PCT/JP2015/084836 dated Mar. 15, 2016, 7 pgs.
Extended European Search Report for related Ep App No. 15866493.8 dated Jul. 31, 2018.

* cited by examiner

DUAL CLUTCH APPARATUS

CROSS-REFERENCE TO RELATED APPLICATIONS

This application is a U.S. National Stage entry of PCT Application No. PCT/JP2015/084836, filed on Dec. 11, 2015, which claims priority to Japanese Patent Application No. 2014-250906, filed Dec. 11, 2014, the contents of which are incorporated herein by reference.

TECHNICAL FIELD

The present invention relates to a dual clutch apparatus.

BACKGROUND ART

Conventionally, there is known a dual clutch type transmission that is provided with a first input shaft connected to a first clutch that connects and disconnects power from an engine and a second input shaft connected to a second clutch that connects and disconnects the power from the engine, and performs a change of speed by alternately switching the first clutch and the second clutch (for example, see Patent Literature 1).

In typical dual clutch type transmissions, one clutch corresponds to a gear train at odd numbered stages, and the other clutch corresponds to a gear train at even numbered stages. For this reason, on shifting up, for example, from a second gear to third gear, in a state in which a clutch for even, numbered stages is connected, and a synchronization mechanism for second gear is engaged, a synchronization mechanism for third gear is engaged. A clutch for odd numbered stages is connected with disconnection, of the clutch for even numbered stages. Thereby, a change of speed in which no torque loss occurs can be realized.

CITATION LIST

Patent Literature

Patent Literature 1: JP-T-2010-531417

SUMMARY OF INVENTION

Technical Problem

In typical dual clutch apparatuses, a clutch is connected by supplying hydraulic pressure to the inside of a hydraulic chamber, releasing the hydraulic pressure from the inside of a hydraulic canceling chamber, and stroke-moving a piston to connect clutch plates under pressure. In addition, when the hydraulic pressure in the hydraulic chamber is released, a return spring in the hydraulic canceling chamber moves away the piston from the clutch plates, and thereby the clutch is disconnected. The supply of the hydraulic pressure to each hydraulic chamber or the release of the hydraulic pressure is controlled by switching ON/OFF of an electromagnetic valve provided to correspond to each hydraulic chamber.

For this reason, for example, when a trouble such as disconnection or fixation occurs at at least one electromagnetic valve, there is a possibility that each clutch is held in a connected state and causes double engagement of a transmission.

One of objects of the present invention is to provide a dual clutch apparatus capable of effectively preventing double engagement of a transmission.

Means for Solving the Problem

Solution to Problem

To solve the problem, a dual clutch apparatus of a first aspect of the present invention is a dual clutch apparatus provided with a first clutch having a first, plate connecting and disconnecting power transmission from an engine to a first transmission input shaft, and a second clutch having a second plate connecting and disconnecting power transmission from the engine to a second transmission input shaft, and includes a first piston, a second piston, a first supply line, a second supply line, a first valve, a second valve, and valve control unit. The first piston presses the first plates to connect the first clutch by means of a hydraulic pressure supplied into a first hydraulic chamber, and moves away from the first plates to disconnect the first clutch by means of a first spring housed in a first hydraulic canceling chamber. The second piston presses the second plates to connect the second clutch by means of a hydraulic pressure supplied into a second hydraulic chamber, and moves away from the second plates to disconnect the second clutch by means of a second spring housed in a second hydraulic canceling chamber. The first supply line supplies the hydraulic pressure to the first hydraulic chamber and the second hydraulic canceling chamber. The second supply line supplies the hydraulic pressure to the second hydraulic chamber and the first hydraulic canceling chamber. The first valve is installed in the first supply line, and allows or blocks supply of the hydraulic pressure to the first hydraulic chamber and the second hydraulic canceling chamber. The second valve is installed in the second supply line, and allows or blocks supply of the hydraulic pressure to the second hydraulic chamber and the first hydraulic canceling chamber. The valve control unit controls opening/closing of the first valve and the second valve. When a clutch connected state in which one of the two valves is opened to connect one of the two clutches and the other valve is closed to disconnect the other clutch is changed to a two-clutch disconnected state in which the two valves are closed to disconnect the two clutches, the valve control unit closes the one valve and opens the other valve, and then closes the other valve before the other clutch is connected.

In the above configuration, when the first valve is opened, the supply of the hydraulic pressure to the first hydraulic chamber and the second hydraulic canceling chamber is allowed, and thus the hydraulic pressure is supplied to the first hydraulic chamber and the second hydraulic canceling chamber via the first supply line. When the hydraulic pressure is supplied to the first hydraulic chamber, the first piston moves from the first hydraulic chamber side due to oil pressure, and presses the first plate to connect the first clutch. When the hydraulic pressure is supplied to the second hydraulic canceling chamber, the second piston moves away from the second plates due to the oil pressure from the second hydraulic canceling chamber side in addition to a biasing force of the second spring. For this reason, even when a trouble such as disconnection or fixation occurs at the second valve, the second piston can reliably move away from the second plates, and double engagement of a transmission can be reliably prevented. When the second valve is opened, the hydraulic pressure is supplied to the first hydraulic canceling chamber. For this reason, the first piston reliably moves away from the first plates, the double engagement of the transmission can be reliably prevented.

When the clutch connected state is changed to the two-clutch disconnected state, the valve control unit closes one of the two valves, and opens the other valve. For example, when, the second clutch connected state in which the first (or the other) clutch is disconnected and the second (or the one) clutch is connected is changed to the two-clutch disconnected state, the valve control unit closes the second valve, and opens the first valve. Since the second valve is closed, the supply of the hydraulic pressure to the second hydraulic chamber is blocked, and the second piston moves away from the second plates due to the biasing force of the second spring. Since the first valve is opened, the supply of the hydraulic pressure to the second hydraulic canceling chamber is allowed, so that the hydraulic pressure is supplied to the second hydraulic canceling chamber, and the second piston moves away from the second plates due to the oil pressure from the second hydraulic canceling chamber side. That is, since the second piston moves away from the second plates due to the oil pressure from the second hydraulic canceling chamber side in addition to the biasing force of the second spring, responsiveness of the second piston when the second clutch is disconnected can be improved.

The valve control unit closes the one valve and opens the other valve, and then closes the other valve before the other clutch is connected. For example, when the valve control unit closes the second (or the one) valve and opens the first (or the other) valve, and then closes the first valve before the first clutch is connected. For this reason, since the hydraulic pressure supplied to the first hydraulic chamber is blocked before the first clutch is connected, the clutch connected state can be reliably changed to the two-clutch disconnected state.

The valve control unit opens the other valve, and then closes the other valve before the other clutch is connected. For example, the valve control unit opens the first (or the other) valve, and then closes the first valve before the first clutch is connected. When the first valve is opened, the hydraulic pressure is supplied to the first hydraulic chamber, and thus the first piston moves in a direction pressing the first plates. When the first, valve is closed before the first clutch is connected, the first piston moving in the direction pressing the first plates moves in a direction moving away from the first plates due to a biasing force of the first spring, and the clutch connected state is changed to the two-clutch, disconnected state. For this reason, when the first clutch is connected at the two-clutch disconnected state, the first, piston may not completely move (not return) in the direction moving away from the first plates due to the biasing force of the first spring. In this case, since the first piston has already moved in the direction pressing the first plates, responsiveness when the first clutch is connected is improved.

Further, a dual clutch apparatus of a second aspect of the present invention is the dual clutch apparatus of the first aspect, and includes time counting unit for counting at least one of an elapsed time after the one valve is closed and an elapsed time after the other valve is opened. When the clutch connected state is changed to the two-clutch disconnected state, the valve control unit closes the one valve and opens the other valve, and then determines, based on the elapsed time counted by the time counting unit, whether or not it is before the other clutch is connected.

In the above configuration, the valve control unit closes the one valve and opens the other valve, and then determines, based on the elapsed time counted by the time counting unit, whether or not it is before the other clutch is connected. For example, when the clutch connected state in which the first (or the other) clutch is disconnected and the second (or the one) clutch is connected is changed to the two-clutch disconnected state, a time (a first clutch connection time) until the first clutch is connected after the first valve is opened is previously obtained by an experiment or a simulation, and a time shorter than the obtained first clutch connection time is set as a given time. The valve control unit closes the second valve and opens the first valve, then determines to be before the first clutch is connected when the elapsed time counted by the time counting unit after the first valve is opened reaches the given time, and closes the first valve.

When the other valve is opened in a state in which the one valve is closed, one piston moves away from the one plates due to the hydraulic pressure supplied to one hydraulic canceling chamber in addition to the biasing force of one spring, and the other piston begins to move toward the other plates against the biasing force of the other spring. That is, after one valve is closed and the other valve is opened, when the other valve is not closed, one clutch is disconnected, and then the other clutch is connected. For this reason, the valve control unit can close the other valve before the other clutch is connected by closing the other valve when the one clutch is disconnected. For example, when the second clutch connected state in which the first (or the other) clutch is disconnected and the second (or the one) clutch is connected is changed to the two-clutch disconnected state, a time (a second clutch disconnection time) until the second clutch is disconnected after the second valve is closed is previously obtained by an experiment or a simulation, the obtained second clutch disconnection time is set as a given time. The valve control unit determines that the second clutch is disconnected (it is before the first clutch is connected) when the elapsed time counted by the time counting unit after the second valve is closed reaches the given time, and closes the first valve.

When the other valve is closed until the other clutch is connected after the one clutch is disconnected, the other valve is opened until at least the one clutch is disconnected, and the hydraulic pressure is supplied to the one hydraulic canceling chamber. For this reason, responsiveness of the one piston when the one clutch is disconnected can be reliably improved. For example, when the second clutch connected state in which the first (or the other) clutch is disconnected and the second (or the one) clutch is connected is changed to the two-clutch disconnected state, and the closing of the second valve and the opening of the first valve are performed nearly at the same time, the second clutch disconnection time and the first clutch connection time are previously obtained by an experiment or a simulation, and a time that is longer than the obtained second clutch disconnection time and is shorter than the obtained first clutch connection time is set as the given time. The valve control unit closes the first valve when the elapsed time counted by the time counting unit after the second valve is closed (the first valve is opened) reaches the given time.

A dual clutch apparatus of a third aspect of the present invention is the dual clutch apparatus of the first aspect, and includes rotating speed detecting unit for detecting a rotating speed of one of the two transmission input shafts to which power from the engine is transmitted via the one clutch. When the clutch connected state is changed to the two-clutch disconnected state, the valve control unit closes the one valve and opens the other valve, then determines, based on the rotating speed detected by the rotating speed detecting unit, whether or not the one clutch is disconnected, and closes the other valve when it is determined that the one clutch is disconnected.

In the above configuration, the valve control unit closes the one valve and opens the other valve, then determines, based on the rotating speed of the one transmission input shaft detected by the rotating speed detecting unit, whether or not the one clutch is disconnected, and closes the other valve when it is determined that the one clutch is disconnected. For example, when the second clutch connected state in which the first (or the other) clutch is disconnected and the second (or the one) clutch is connected is changed to the two-clutch disconnected state, a reduction ratio of the rotating speed of the second transmission input shaft when the second clutch is changed from connection to disconnection is obtained by an experiment or a simulation, and is set as a given reduction ratio. When a reduction ratio per unit time of the rotating speed of the second transmission input shaft after the first valve is opened is greater than or equal to the given reduction ratio, it is determined that the second clutch is disconnected. As described above, when the first valve is opened in the state in which the second valve is closed, the second clutch is disconnected, and then the first clutch is connected. For this reason, the valve control unit determines that the second clutch is disconnected, and that it is before the first clutch is connected.

A dual, clutch apparatus of a fourth aspect of the present invention is a dual clutch, apparatus provided with a first clutch having a first plate connecting and disconnecting power transmission from an engine to a first transmission input shaft, and a second clutch having a second plate connecting and disconnecting power transmission from the engine to a second transmission input shaft, and includes a first piston, a second piston, a first supply line, a second supply line, a first valve, a second valve, and valve control unit. The first piston presses the first plates to connect the first clutch by a hydraulic pressure supplied into a first hydraulic chamber, and moves away from the first plates to disconnect the first clutch by a first spring housed in a first hydraulic canceling chamber. The second piston, presses the second plates to connect the second clutch by a hydraulic pressure supplied into a second hydraulic chamber, and moves away from the second plates to disconnect the second clutch by a second spring housed in a second hydraulic canceling chamber. The first supply line supplies the hydraulic pressure to the first hydraulic chamber and the second hydraulic canceling chamber. The second supply line supplies the hydraulic pressure to the second hydraulic chamber and the first hydraulic canceling chamber. The first valve is installed in the first supply line, and makes it possible to adjust the hydraulic pressure supplied to the first hydraulic chamber and the second hydraulic canceling chamber. The second valve is installed in the second supply line, and makes it possible to adjust the hydraulic pressure supplied to the second hydraulic chamber and the first hydraulic canceling chamber. The valve control unit controls opening/closing of the first valve and the second valve. When a clutch connected state in which one of the two valves is opened to connect one of the two clutches and the other valve is closed to disconnect the other clutch is changed to a two-clutch disconnected state in which the two valves are closed to disconnect the two clutches, the valve control unit opens the other valve such that oil pressure smaller than a biasing force of the other spring disconnecting the other clutch acts on the other piston connecting and disconnecting the other clutch from the other hydraulic chamber side, and closes the one valve.

In the above configuration, like the dual clutch apparatus of the first aspect, when the first valve is opened, the supply of the hydraulic pressure to the first hydraulic chamber and the second hydraulic canceling chamber is allowed. For this reason, for example, even when a trouble such as disconnection or fixation occurs at the second valve, the second piston, can reliably move away from the second plates, and the double engagement of the transmission can be reliably prevented. When the second valve is opened, the hydraulic pressure is supplied to the first hydraulic canceling chamber. For this reason, the first piston can reliably move away from the first plates, and the double engagement of the transmission can be reliably prevented.

The valve control unit opens the other valve such that the oil pressure smaller than the biasing force of the other spring acts on the other piston from the other hydraulic chamber side. When the second clutch connected state in which the first (or the other) clutch is disconnected and the second (or the one) clutch is connected is changed, to the two-clutch disconnected state, the second valve is opened such that the oil pressure smaller than the biasing force of the second spring acts on the second piston from the second hydraulic chamber side, for example. For this reason, even when the second valve is opened, the second piston does not move in a direction pressing the second plates due to the oil pressure from the second hydraulic chamber side, and the second clutch is not connected. That is, the valve control unit can improve the responsiveness of the first piston when supplying the hydraulic pressure to the first hydraulic, canceling chamber to disconnect the first clutch without opening the second valve to connect the second clutch.

Advantageous Effect of the Invention

According to the dual clutch apparatus of the present invention, double engagement of a transmission can be effectively prevented.

DESCRIPTION OF EMBODIMENTS

Hereinafter, a first embodiment of the present invention will be described on the basis of the drawings.

Figure 1:
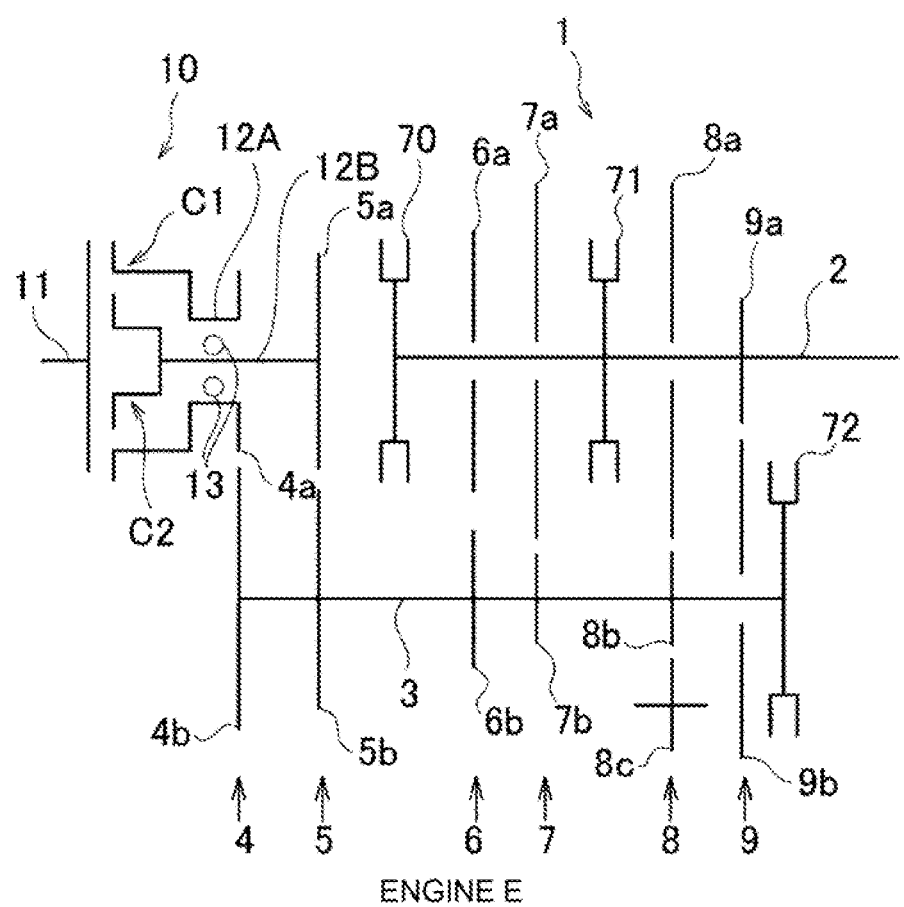
FIG. 1 is a gear layout view of a dual, clutch type transmission connected to a dual clutch apparatus according to a first embodiment of the present invention.

As illustrated in FIG. 1, a dual clutch apparatus to according to the present embodiment is connected to a dual clutch type transmission 1, and transmits a rotating force from an engine E to the dual clutch type transmission 1. The dual clutch apparatus 10 is provided with a first wet clutch C1 and a second wet clutch C2. Note that a reference sign 11 indicates a clutch input shaft to which power of the engine E is transmitted.

The dual clutch type transmission 1 has a first transmission input shaft 12A, a second transmission input shaft 12B, an output shaft 2, and a counter shaft 3. The first transmission input shaft 12A is an outer shaft formed in a tube shape, and is used, for example, in odd numbered stages of the dual clutch type transmission 1 (see FIG. 2). The second transmission input shaft 12B is an inner shaft that is rotatably and pivotally supported in a hollow shaft of the first transmission input shaft 12A via a bearing 13, and is used, for example, in even numbered stages of the dual clutch type transmission 1 (see FIG. 2). The output shaft 2 is arranged coaxially with axes of rotation of the first transmission input shaft 12A and the second transmission input shaft 12B. The counter shaft 3 is arranged to be parallel with axes of rotation of the first transmission input shaft 12A, the second transmission input shaft 12B, and the output shaft 2. Each of the shafts 12A, 12B, 2, and 3 is provided with a plurality of gears, and a plurality of gear trains 4 to 9 are constituted by the gears.

The plurality of gear trains 4 to 9 are arranged from the engine E in the order of a first reduction gear train 4, a second reduction gear train 5, a third and fourth gears' gear train 6, a first and second gears' gear train 7, a reverse gear train 8, and a seventh and eighth gears' gear train 9 in turns. The first reduction gear train 4 is constituted by a first input gear 4a of the first transmission input shaft 12A and a first intermediate gear 4b of the counter shaft 3. The second reduction gear train 5 is constituted by a second input gear 5a of the second transmission input shaft 12B and a second intermediate gear 5b. The third and fourth gears' gear train 6 is constituted by a first output gear 6a of the output shaft 2 and a third intermediate gear 6b of the counter shaft 3. The first and second gears' gear train 7 is constituted by a second output gear 7a of the output shaft 2 and a fourth intermediate gear 7b of the counter shaft 3. The reverse gear train 8 is constituted by a third output gear 8a of the output shaft 2, a fifth intermediate gear 8b of the counter shaft 3 and an idler gear 8c. The seventh and eighth gears' gear train 9 is constituted by a fourth output gear 9a of the output shaft 2 and a sixth intermediate gear 9b of the counter shaft 3.

The first output gear 6a, the second output gear 7a, and the third output gear 8a of the output shaft 2 are provided to be rotatable relative to the output shaft 2, and the fourth output gear 9a is fixedly provided for the output shaft 2. The first output gear 6a can be connected to and disconnected from the output shaft 2 by movement of a first sleeve 70, and the second output gear 7a and the third output gear 8a can be connected to and disconnected from the output shaft 2 by movement of a second sleeve 71. The first intermediate gear 4b, the second intermediate gear 5b, the third intermediate gear 6b, the fourth intermediate gear 7b, and the fifth intermediate gear 8b of the counter shaft 3 is fixedly provided for the counter shaft 3, and the sixth intermediate gear 9b is provided to be rotatable relative to the counter shaft 3. The sixth intermediate gear 9b can be connected to and disconnected from the counter shaft 3 by movement of a third sleeve 72.

Figure 2:
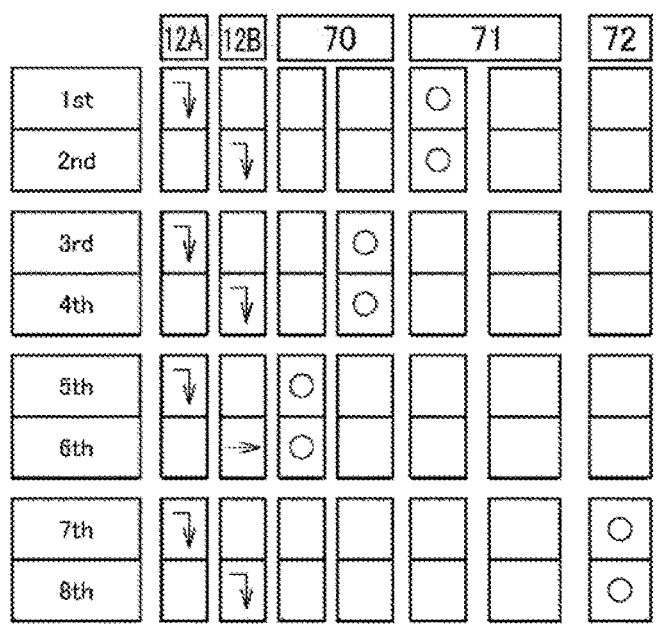
FIG. 2 is a view illustrating an operated state corresponding to a shift position of the dual clutch type transmission of FIG. 1.

As illustrated in FIG. 2, in a state in which the output shaft 2 and the second output gear 7a are connected by the movement of the second sleeve 71, when the power of the engine E is transmitted from the clutch input shaft 11 to the first transmission input shaft 12A, the dual clutch type transmission 1 becomes a first gear, and when transmitted to the second transmission input shaft 12B, the dual clutch type transmission 1 becomes a second gear. In a state in which the output shaft 2 and the first output gear 6a are connected, by the movement of the first sleeve 70, when the power of the engine E is transmitted from the clutch input shaft 11 to the first transmission input shaft 12A, the dual clutch type transmission 1 becomes a third gear, and when transmitted to the second transmission input shaft 12B, the dual clutch type transmission 1 becomes a fourth gear. In a state in which the second transmission input shaft 12B and the output shaft 2 are connected by the movement of the first sleeve 70, when the power of the engine E is transmitted from the clutch input shaft 11 to the first transmission input shaft 12A, the dual clutch type transmission 1 becomes a fifth gear, and when transmitted to the second transmission, input shaft 12B, the dual clutch type transmission 1 becomes a sixth gear. In a state in which the counter shaft 3 and the sixth intermediate gear 9b are connected by the movement of the third sleeve 72, when the power of the engine E is transmitted from the clutch input shaft 11 to the first transmission input shaft 12A, the dual clutch type transmission 1 becomes a seventh gear, and when transmitted to the second transmission input shaft 12B, the dual clutch type transmission 1 becomes an eighth gear.

Figure 3:
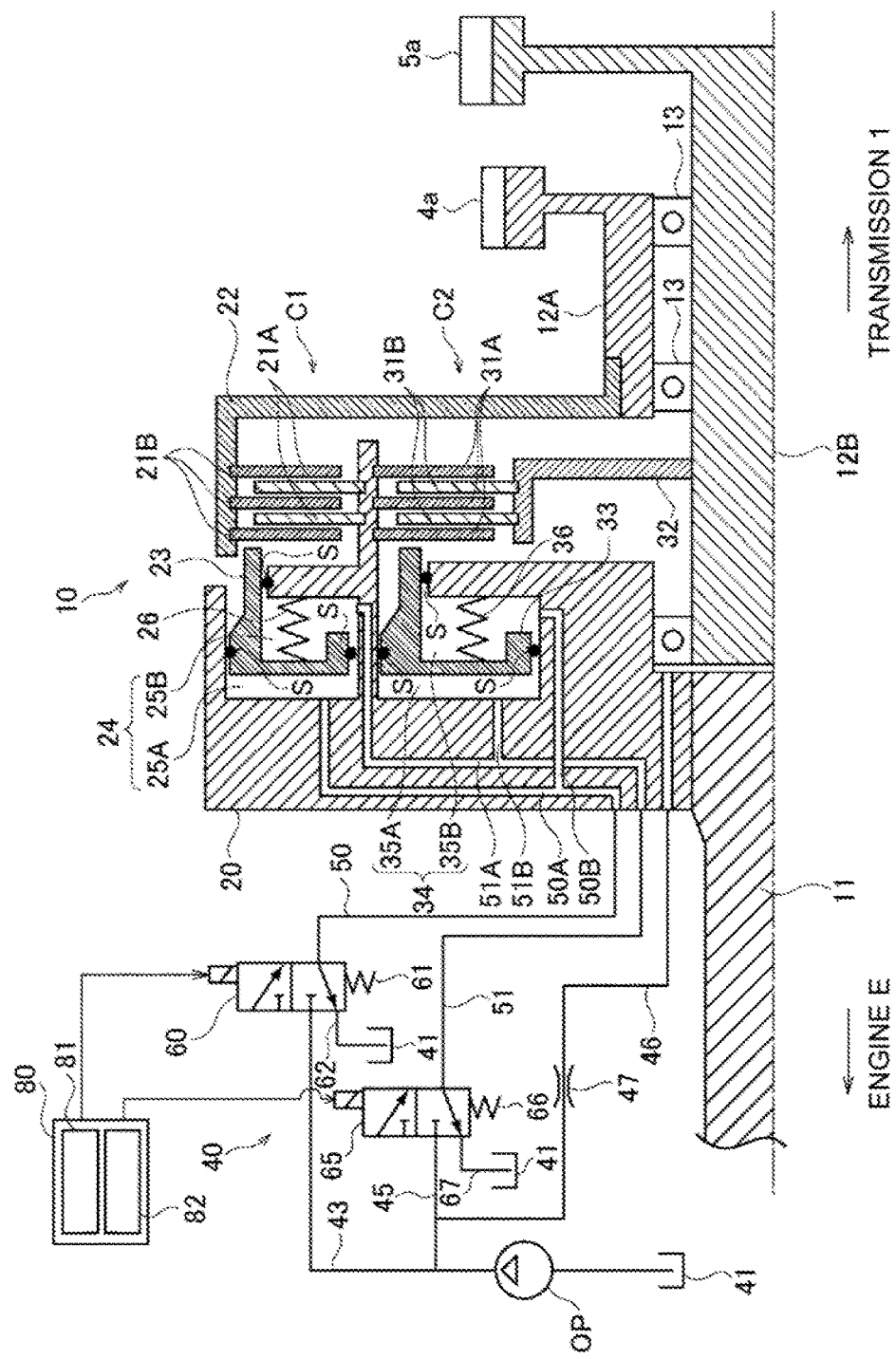
FIG. 3 is a schematic longitudinal sectional view illustrating an upper half of the dual clutch apparatus according to the first embodiment.

As illustrated FIG. 3, the dual clutch apparatus 10 is provided with a first wet clutch C1, a first piston 23, a second wet clutch C2, a second piston 33, a hydraulic pressure circuit 40, a first electromagnetic valve (a first valve) 60, a second electromagnetic valve (a second valve) 65, and an electronic control unit (valve control unit or time counting unit) 80 (hereinafter, referred to as an electric control unit (ECU)).

The first wet clutch C1 is provided with a clutch hub 20 that is rotated integrally with the clutch input shaft 11, a plurality of first inner plates 21A that are spline-fitted with the clutch hub 20, a first clutch drum 22 that is rotated integrally with the first transmission input shaft 12A, and a plurality of first outer plates 21B that are alternately arranged between the first inner plates 21A and are spline-fitted with the first clutch drum 22.

The first piston 23 is formed in a cylindrical shape, can press each of the first plates 21A and 21B in an axial direction, and is slidably housed in an annular first piston, chamber 24 formed in the clutch hub 20. A first hydraulic chamber 25A and a first centrifugal hydraulic canceling chamber (a first hydraulic canceling chamber) 25B are defined in the first piston chamber 24 by the first piston 23. A first return spring (a first spring) 26 biasing the first, piston 23 in a direction in which the first piston 23 moves away from, each of the first plates 21A and 21B is housed in the first centrifugal hydraulic canceling chamber 25B. A reference sign S indicates a seal member that seals a gap between the first piston 23 and the first piston chamber 24.

When hydraulic pressure is supplied to the first hydraulic chamber 25A, the first piston 23 stroke-moves in an axial direction to connect the first plates 21A and 21B under pressure (the first wet clutch C1: connection). On the other hand, when the hydraulic pressure of the first hydraulic chamber 25A is dropped and hydraulic pressure is supplied to the first centrifugal hydraulic canceling chamber 25B, the first piston 23 moves away from each of the first plates 21A and 21B due to a biasing force of the first return spring 26 and oil pressure inside the first centrifugal hydraulic canceling chamber 25B, and releases the pressure-connected state (the first wet clutch C1: disconnection). In this specification, the hydraulic pressure refers to a force that is applied per unit area of a target by pressure oil. In addition, the oil pressure refers to a force that is applied to a target by pressure oil, and a value obtained by multiplying hydraulic pressure and an area.

The second wet clutch C2 is provided with a plurality of second outer plates 31A that are spline-fitted with the clutch hub 20, a second clutch drum 32 that is rotated integrally with the second transmission input shaft 12B, and a plurality of second inner plates 31B that are alternately arranged between the second outer plates 31A and are spline-fitted, with the second clutch drum 32.

The second piston 33 is formed in a cylindrical shape, can connect the second plates 31A and 31B under pressure in an axial direction, and is slidably housed in an annular second piston chamber 34 formed in the clutch hub 20. A second hydraulic chamber 35A and a second centrifugal hydraulic canceling chamber (a second hydraulic canceling chamber) 35B are defined in the second piston chamber 34 by the second piston 33. A second return spring (a second spring) 36 biasing the second piston 33 in a direction in which the second piston 33 moves away from each of the second plates 31A and 31B is housed in the second centrifugal hydraulic canceling chamber 35B. A reference sign S indicates a seal member that seals a gap between the second piston 33 and the second piston chamber 34.

When hydraulic pressure is supplied to the second hydraulic chamber 35A, the second piston 33 stroke-moves in an axial, direction to connect the second plates 31A and 31B under pressure (the second wet clutch C2: connection). On the other hand, when the hydraulic pressure of the second hydraulic chamber 35A is dropped and hydraulic pressure is supplied to the second centrifugal hydraulic canceling chamber 35B, the second piston 33 moves away from each of the second plates 31A and 31B due to a biasing force of the second return spring 36 and oil pressure inside the second, centrifugal hydraulic canceling chamber 35B, and releases the pressure-connected state (the second wet clutch C2: disconnection).

The hydraulic pressure circuit 40 has a first upstream supply line (a first supply line) 43 that connects an oil pan 41 and a first electromagnetic valve 60, and a second upstream supply line (a second supply line) 45 that branches off from the first upstream supply line 43 and is connected to the second electromagnetic valve 65. An oil pump OP driven by the power of the engine E is installed on the first upstream supply line 43 upstream from the branch part. A lubricating oil supply line 46 on which a throttle valve 47 is installed is connected to the second upstream supply line 45.

A first downstream supply line (a first supply line) 50 is connected to the first electromagnetic valve 60. The first downstream supply line 50 branches off into a first hydraulic chamber-purpose line 50A and a second canceling chamber-purpose line 50B in the clutch hub 20. A downstream end of the first hydraulic chamber-purpose line 50A is connected to the first hydraulic chamber 25A, and a downstream end of the second canceling chamber-purpose line 50B is connected to the second centrifugal hydraulic canceling chamber 35B.

The first electromagnetic valve 60 is closed by a biasing force of a spring 61 during non-current application (OFF), and is opened when current application (ON) is performed by the ECU 80. When the first electromagnetic valve 60 is opened (ON), pressure oil is supplied to the first hydraulic chamber 25A and the second centrifugal hydraulic canceling chamber 35B. On the other hand, when the first electromagnetic valve 60 is closed (OFF), no pressure oil is supplied to the first hydraulic chamber 25A and the second centrifugal hydraulic canceling chamber 35B, and the pressure oil inside the first hydraulic chamber 25A and the second centrifugal hydraulic canceling chamber 35B returns to the oil pan 41 via an oil return line 62.

A second downstream supply line (a second supply line) 51 is connected to the second electromagnetic valve 65. The second downstream supply line 51 branches off into a second hydraulic chamber-purpose line 51A and a first canceling chamber-purpose line 51B in the clutch hub 20. A downstream end of the second hydraulic chamber-purpose line 51A is connected to the second hydraulic chamber 35A, and a downstream end of the first canceling chamber-purpose line 51B is connected to the first centrifugal hydraulic canceling chamber 25B.

The second electromagnetic valve 65 is closed, by a biasing force of a spring 66 during non-current application (OFF), and is opened when current application (ON) is performed by the ECU 80. When the second electromagnetic valve 65 is opened (ON), pressure oil is supplied, to the second hydraulic chamber 35A and the first centrifugal hydraulic canceling chamber 25B. On the other hand, when the second electromagnetic valve 65 is closed (OFF), no pressure oil is supplied to the second hydraulic chamber 35A and the first centrifugal hydraulic canceling chamber 25B, and the pressure oil inside the second hydraulic chamber 35A and the first centrifugal hydraulic canceling chamber 25B returns to the oil pan 41 via an oil return line 67.

The ECU 80 is made up of a central processing unit (CPU), a memory (not shown), and the like, has a valve control part 81 and a time counting part 82, and functions as valve control unit and time counting unit.

The tune counting part 82 counts an elapsed time after the first electromagnetic valve 60 is turned ON when a clutch connected state is changed to a two-clutch disconnected state (to be described below). As will be described below, since ON of the first electromagnetic valve 60 and OFF of the second electromagnetic valve 65 are performed approximately at the same time, the time counting part 82 may count an elapsed time after the second electromagnetic valve 65 is turned OFF.

The valve control part 81 controls opening/closing of the first electromagnetic valve 60 and the second electromagnetic valve 65, and thereby switching a first clutch connected state (see FIG. 4) in which the first wet clutch C1 is connected and the second wet clutch C2 is disconnected, a second clutch connected state (see FIG. 5) in which the first wet clutch C1 is disconnected and the second wet clutch C2 is connected, and the two-clutch disconnected state (see FIG. 3) in which the first wet clutch C1 and the second wet clutch C2 are disconnected.

Figure 4:
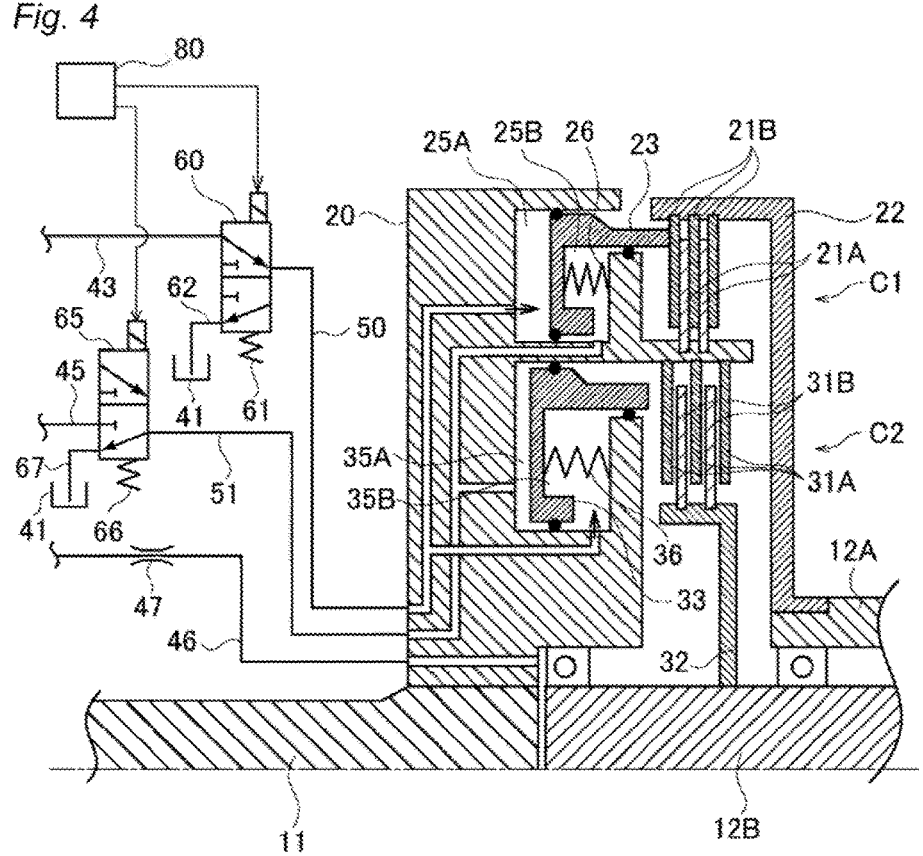
FIG. 4 is a view illustrating a state in which, a first, wet clutch, is connected and a second wet clutch is disconnected in the dual clutch apparatus according to the first embodiment.

As illustrated in FIG. 2, in the dual clutch type transmission 1, in the event of odd numbered stages (first gear, third gear, fifth gear, and seventh gear), the power of the engine E is transmitted from the clinch input shaft 11 to the first transmission input shaft 12A. For this reason, as illustrated in FIG. 4 the valve control part 81 turns ON the first electromagnetic valve 60 and turns OFF the second electromagnetic valve 65 to be made into the first clutch connected state. For example, when the dual clutch type transmission 1 is set to the first gear, the valve control part 81 turns ON the first electromagnetic valve 60 and turns OFF the second electromagnetic valve 65 to be made info the first clutch connected state in a state in which the output shaft 2 and the second output gear 7a are connected by the movement of the second sleeve 71. Thereby, the power of the engine E is input from the clutch input shaft 11 to the first transmission input shaft 12A, and is transmitted to the output shaft 2 via the first reduction gear train 4, the counter shaft 3, and the first and second gears' gear train 7.

Figure 5:
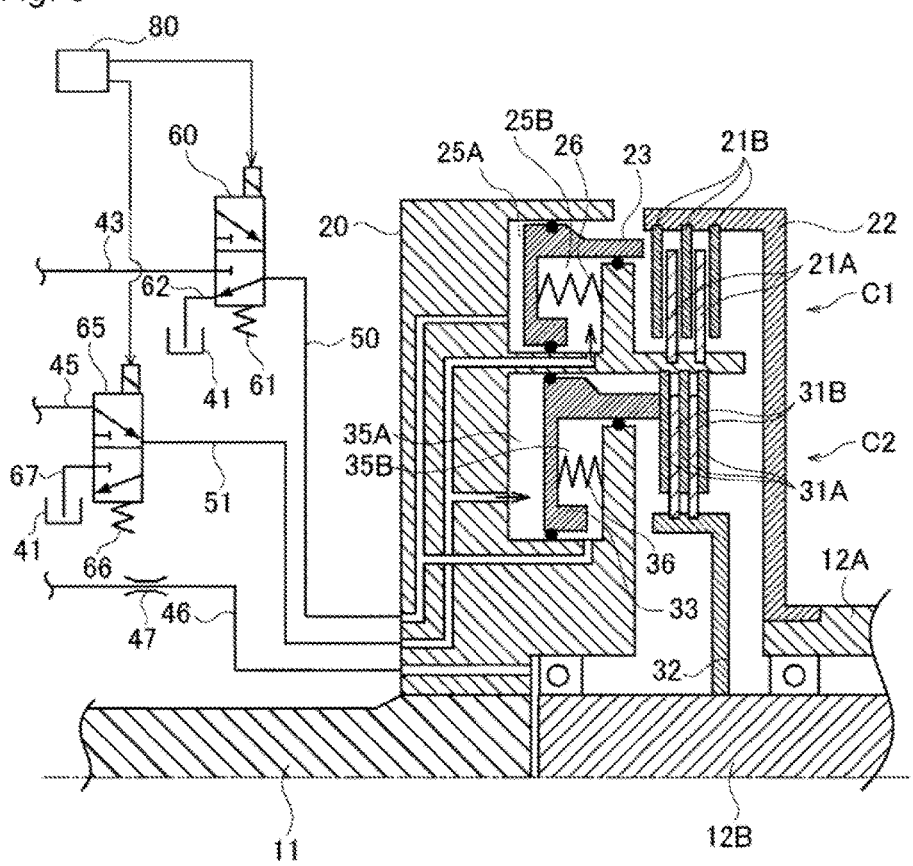
FIG. 5 is a view illustrating a state in which the first wet clutch is disconnected and the second wet clutch is connected in the dual clutch apparatus according to the first embodiment.

As illustrated in FIG. 2, in the dual clutch type transmission 1, in the event of even numbered stages (second gear, fourth gear, sixth gear, and eighth gear), the power of the engine E is transmitted from the clutch input shaft 11 to the second transmission input shaft 12B. For this reason, as illustrated in FIG. 5, the valve control part 81 turns OFF the first electromagnetic valve 60 and turns ON the second electromagnetic valve 65 to be made into the second clutch connected state. For example, on shifting up from the first gear to the second gear, the valve control part 81 turns OFF the first electromagnetic valve 60 and turns ON the second electromagnetic valve 65 to be changed from the first clutch connected state into the second clutch connected state in a state in which the output shaft 2 and the second output gear 7a are still connected by the second sleeve 71 without moving each of the sleeves 70 to 72. Thereby, the power of the engine E is input from the clutch input shaft 11 to the second transmission input shaft 12B, and is transmitted to the output shaft 2 via the second reduction gear train 5, the counter shaft 3, and the first and second gears' gear train 7.

As illustrated to FIG. 2, in the dual clutch type transmission 1, on shifting up from the even numbered stage to the odd numbered stage (from the second gear to the third gear, from the fourth gear to the fifth gear, or from the sixth gear to the seventh gear), movement of any one of the sleeves 70 to 72 occurs. For this reason, a change from the second clutch connected state (the clutch connected state) in which the second wet clutch C2 is connected by turning OFF the first (or the other) electromagnetic valve 60 and turning ON the second (or the one) electromagnetic valve 65 to the two-clutch, disconnected state in which the second wet clutch C2 is disconnected is performed. After the sleeve is moved, a change from the two-clutch disconnected state to the first clutch connected state in which the first, wet clutch C1 is connected is performed. When the second clutch connected state is changed into the two-clutch disconnected state, the valve control part 81 turns OFF the second electromagnetic valve 65 and nearly simultaneously turns ON the first electromagnetic valve 60, and determines that it is before the first wet clutch C1 is connected when an elapsed time which the time counting part 82 counts (an elapsed time after the first electromagnetic valve 60 is turned ON) reaches a given elapsed time set previously, and then turns OFF the first electromagnetic valve 60. A time (a second clutch disconnection time) until the second wet clutch C2 is disconnected after the second electromagnetic valve 65 is turned OFF, and a time (a first clutch connection lime) until the first wet clutch C1 is connected after the first electromagnetic valve 60 is turned ON are previously obtained by an experiment or a simulation, and a time that is longer than the obtained second clutch disconnection time and is shorter than the obtained first clutch connection time is set as the given elapsed time.

Figure 6:
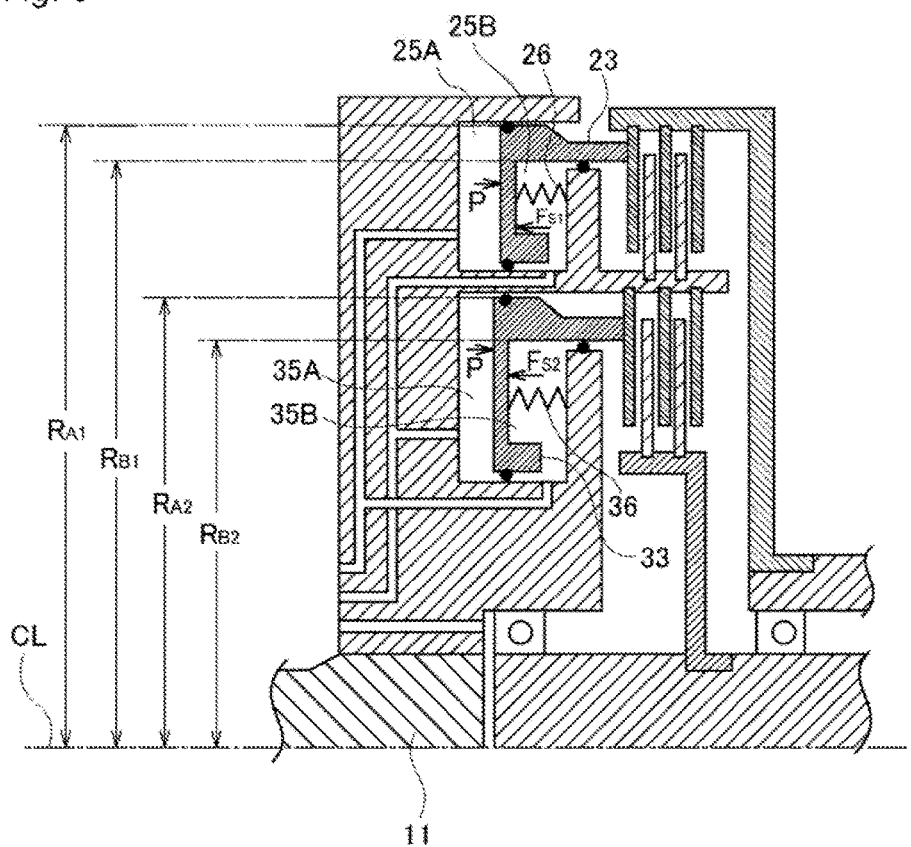
FIG. 6 is a view illustrating hydraulic pressure acting on each piston, and a biasing force of each return spring in the dual clutch apparatus according to the first embodiment.

Next, setting of an optimal biasing force of each of the return springs 26 and 36 will be described on the basis of FIG. 6. In FIG. 6, RA1 indicates an outer diameter of the first piston 23, RB1 indicates an outer diameter of the first centrifugal hydraulic canceling chamber 25B, RA2 indicates an outer diameter of the second piston 33, RB2 indicates an outer diameter of the second centrifugal hydraulic canceling chamber 35B, P indicates a hydraulic pressure, FS1 indicates a biasing force of the first return spring 26, FS2 indicates a biasing force of the second return spring 36, CL indicates an axis of rotation of the clutch input shaft 11. The outer diameters represent radii from the axis CL of rotation.

The biasing force FS1 of the first return spring 26 is set to meet Conditional Expression (1) below, and the biasing force FS2 of the second return spring 36 is set to meet Conditional Expression (2) below.

[Expression 1]

$$(R_{A1}^2 - R_{B1}^2) \cdot \pi \cdot P < F_{S1} \tag{1}$$

[Expression 2]

$$(R_{A2}^2 - R_{B2}^2) \cdot \pi \cdot P < F_{S2} \tag{2}$$

In the dual clutch apparatus 10 configured as described above, when the power is transmitted from the clutch input shaft 11 to the first transmission input shaft 12A, as illustrated in FIG. 4, the first wet clutch C1 is connected (the first electromagnetic valve 60: ON), and the second wet clutch C2 is disconnected (the second electromagnetic valve 65: OFF). When, the first electromagnetic valve 60 is turned ON, the hydraulic pressure is supplied to not only the first hydraulic chamber 25A but also the second centrifugal hydraulic canceling chamber 35B. For this reason, both the biasing force FS2 of the second return spring 36 and the oil pressure inside the second centrifugal hydraulic canceling chamber 35B act on the second piston 33. As a result, for example, even when a trouble such as disconnection or fixation occurs at the second electromagnetic valve 65, the second piston 33 can reliably move away from each of the plates 31A and 31B, and double engagement of the transmission can be reliably prevented.

When the power is transmitted from the clutch, input shaft 11 to the second transmission input shaft 12B, as illustrated in FIG. 5, the first wet-clutch C1 is disconnected (the first electromagnetic valve 60: OFF), and the second wet clutch C2 is connected (the second electromagnetic valve 65: ON). When the second electromagnetic valve 65 is turned ON, the hydraulic pressure is supplied to not only the second hydraulic chamber 35A but also the first centrifugal hydraulic canceling chamber 25B. For this reason, both the biasing force FS1 of the first return spring 26 and the oil pressure inside the first centrifugal hydraulic canceling chamber 25B act on the first piston 23. As a result, for example, even when a trouble such as disconnection or fixation occurs at the first electromagnetic valve 60, the first piston 23 can reliably move away from each of the plates 21A and 21B, and the double engagement of the transmission can be reliably prevented.

Since the biasing force FS1 of the first return spring 26 is set to be greater than, a difference between the oil pressures of the first hydraulic chamber 25A and the first centrifugal hydraulic canceling, chamber 25B which act on the first piston 23, and the biasing force FS2 of the second return spring 36 is set to be greater than a difference between the oil pressures of the second hydraulic chamber 35A and the second centrifugal hydraulic canceling chamber 35B which act on the second piston 33, the first and second wet clutches C1 and C2 are reliably disconnected, and the double engagement of the transmission can be effectively prevented.

When the second clutch connected state is changed into the two-clutch disconnected state, the valve control part 81 turns OFF the second electromagnetic valve 65, and nearly simultaneously turns ON the first electromagnetic valve 60. Since the second electromagnetic valve 65 is turned OFF, the supply of the hydraulic pressure to the second hydraulic chamber 35A is blocked, and the second piston 33 moves away from each of the second plates 31A and 31B due to the biasing force FS2 of the second return spring 36. Since the first electromagnetic valve 60 is opened, the supply of the hydraulic pressure to the second centrifugal hydraulic canceling chamber 35B is allowed. The hydraulic pressure is supplied to the second centrifugal hydraulic canceling chamber 35B, and the second piston 33 moves away from each of the second plates 31A and 31B due to the oil pressure from the second centrifugal hydraulic canceling chamber 35B side. That is, since the second piston 33 moves away from each of the second plates 31A and 31B due to the oil pressure from the second centrifugal hydraulic canceling chamber 35B side in addition to the biasing force FS2 of the second return spring 36, responsiveness of the second piston 33 when the second wet clutch C2 is disconnected can be improved.

When the second clutch connected state is changed into the two-clutch disconnected state, the valve control part 81 turns OFF the second electromagnetic valve 65 and nearly simultaneously turns ON the first electromagnetic valve 60, and then turns OFF the first electromagnetic valve 60 before the first wet clutch C1 is connected. When the valve control part 81 turns ON the first electromagnetic valve 60, the hydraulic pressure is supplied to the first hydraulic chamber 25A, and thus the first piston 23 moves in a direction in which it presses each of the first plates 21A and 21B. Afterwards, when the first electromagnetic valve 60 is turned OFF before the first wet clutch C1 is connected, the hydraulic pressure to be supplied to the first hydraulic chamber 25A is blocked, and thus the first piston 23 that has moved, in the direction pressing each of the first plates 21A and 21B is moved in a direction in which it moves away from each of the first plates 21A and 21B due to the biasing force FS1 of the first return spring 26, and the second clutch connected state becomes the two-clutch disconnected state. In this way, as the first electromagnetic valve 60 is turned OFF before the first wet clutch C1 is connected, the second clutch connected state can be reliably changed to the two-clutch disconnected state.

When the second clutch connected state is changed to the two-clutch disconnected state, the valve control, part 81 turns OFF the second electromagnetic valve 65 and nearly simultaneously turns ON the first electromagnetic valve 60. When the elapsed time which the time counting part 82 counts reaches the given elapsed time, the valve control, part 81 turns OFF the first electromagnetic valve 60. A time that is longer than the second clutch disconnection time and is shorter than the first clutch connection time is set as the given elapsed time. That is, the valve control part 81 turns OFF the first electromagnetic valve 60 after the second wet clutch C2 is disconnected and before the first wet clutch C1 is connected. In this way, the first electromagnetic valve 60 is opened until at least the second wet clutch C2 is disconnected, and the hydraulic pressure is supplied to the second centrifugal hydraulic canceling chamber 35B. For this reason, the responsiveness of the second piston 33 when the second wet clutch C2 is disconnected can be reliably improved.

On shifting up, for example, from the second gear to the third gear, a change from the second clutch connected state of the second gear to the two-clutch disconnected slate for the movement of the sleeves 70 and 71 is performed, and a change from the two-clutch disconnected state to the first clutch connected state after the movement of the sleeves 70 and 71 is performed. When the change from the two-clutch disconnected state to the first clutch connected state is performed, the first piston 23, which has moved in the direction pressing each of the first plates 21A and 21B in the event of the change from the second clutch connected state to the two-clutch disconnected, state, may not completely move (not return) in the direction moving away from each of the first plates 21A and 21B due to the biasing force FS1 of the first return spring 26. In this case, since the first piston 23 has already moved in the direction pressing each of the first plates 21A and 21B, responsiveness when the first wet clutch C1 is connected is improved.

In the present embodiment, the time that is longer than the second clutch disconnection time and is shorter than the first clutch connection, time is set as the given elapsed time, but the invention, is not limited thereto. The set time may be a time shorter than the first clutch connection time. For example, the second clutch disconnection time may be set as the given elapsed time, the valve control part 81 may determine that the second wet clutch C2 is disconnected (before the first wet clutch C1 is connected) when the elapsed time which the time counting part 82 counts (the elapsed time after the first electromagnetic valve 60 is turned ON) reaches the second clutch disconnection time, and turn OFF the first electromagnetic valve 60. Alternatively, a time shorter than the second clutch disconnection time may be set as the given elapsed time.

In the present embodiment, the change from the second clutch connected state to the two-clutch disconnected state which is performed on shifting up from the even numbered, stage to the odd numbered stage (from the second gear to the third gear, from the fourth gear to the fifth gear, or from the sixth gear to the seventh gear) has been described. However, the invention may be also applied to the case of a change from the first clutch connected state to the two-clutch disconnected state which is performed on shifting down from the odd numbered stage to the even numbered stage. In this case, the first (or the one) electromagnetic valve 60 is turned OFF, and nearly simultaneously the second (or the other) electromagnetic valve 65 is turned ON. Then, before the second wet clutch C2 is connected, the second electromagnetic valve 65 is turned OFF.

In the present embodiment, when the second clutch connected state is changed to the two-clutch disconnected state, the valve control part 81 turns OFF the second electromagnetic valve 65 and nearly simultaneously turns ON the first electromagnetic valve 60. However, OFF of the second electromagnetic valve 65 and ON of the first electromagnetic valve 60 may not be performed nearly at the same time. Even when OFF of the second electromagnetic valve 65 and ON of the first electromagnetic valve 60 are performed with different timings, if a time for which the first electromagnetic valve 60 is turned ON after the second electromagnetic valve 65 is turned OFF (or the second electromagnetic valve 65 is turned OFF after the first electromagnetic valve 60 is turned ON) is constant, the time counting part 82 may count any one of an elapsed time after the first electromagnetic valve 60 is turned ON and an elapsed time after the second electromagnetic valve 65 is turned OFF.

In the present embodiment, the ECU 80 has the valve control part 81 and the time counting part 82, and functions as the valve control unit and the time counting unit, but the invention is not limited thereto. For example, the ECU 80 may have the valve control part 81 to function as the valve control unit, and acquire an elapsed time which the time counting part (the time counting unit) provided separately from the ECU 80 counts.

Next, a second embodiment of the present invention will be described on the basis of the drawings. A dual clutch apparatus 90 according to the present embodiment is different from that of the first embodiment in that it is determined on the basis of a rotating speed of a second transmission input shaft 12B whether it is before a first wet clutch C1 is connected when a clutch connected state is changed to a two-clutch disconnected state. The same components as the first embodiment are given the same reference signs, and description thereof will be omitted.

Figure 7:
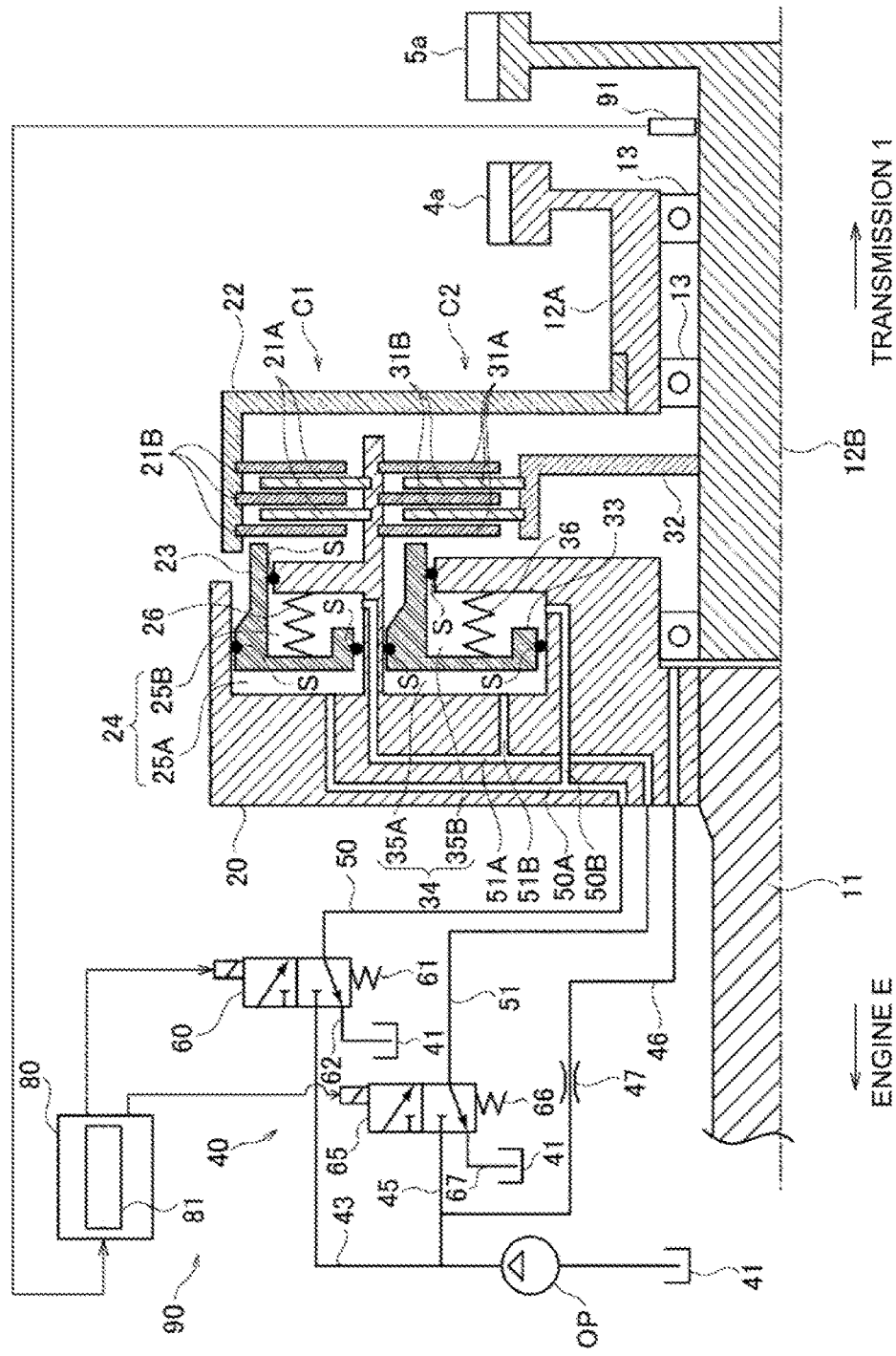
FIG. 7 is a schematic longitudinal sectional view illustrating an upper half of a dual clutch apparatus according to a second embodiment.

As illustrated in FIG. 7, the dual clinch apparatus 90 is provided with a rotating speed sensor (rotating speed detecting unit) 91 that detects the rotating speed of the second transmission input shaft 12B.

The rotating speed sensor 91 detects the rotating speed of the second transmission input shaft 12B, and sequentially outputs it to an ECU 80.

When a second clutch connected state (see FIG. 5) is changed to a two-clutch disconnected state (see FIG. 7), a valve control part 81 of the ECU 80 turns OFF a second electromagnetic valve 65 and nearly simultaneously turns ON a first electromagnetic valve 60. Then, the valve control part 81 obtains a reduction ratio per unit time of the rotating speed of the second transmission input shaft 12B from the rotating speed of the second transmission input shaft 12B which is detected, by the rotating speed sensor 91, and determines that a second wet clutch C2 is disconnected when the obtained reduction ratio is greater than or equal to a given reduction ratio set previously. That is, as the valve control part 81 determines that the second wet clutch C2 is disconnected, the valve control part 81 determines that it is before the first wet clutch C1 is connected, and turns OFF the first electromagnetic valve 60. The reduction ratio of the rotating speed of the second transmission input shaft 12B when the second wet clutch C2 is changed from connection to disconnection is previously obtained by an experiment or a simulation, and the obtained reduction ratio is set as the given reduction ratio.

In the above-configuration, the valve control part 81 can determine whether or not it is before the first wet clutch C1 is connected by determining whether or not, based on the rotating speed of the second transmission input shaft 12B, the second wet clutch C2 is disconnected.

In the present embodiment, whether or not the second wet clutch C2 is disconnected is determined by a comparison of the reduction ratio per unit time of the rotating speed of the second transmission input shaft 12B and the given reduction ration set previously, but the invention is not limited thereto. For example, whether or not the second wet clutch C2 is disconnected may be determined using a difference in the rotating speed per unit time of the second transmission input shaft 12B or the like.

Next, a third embodiment of the present invention will be described on the basis of the drawings. A dual clutch apparatus 100 according to the present embodiment is provided with a first hydraulic pressure regulation valve 101 and a second hydraulic pressure regulation valve 102 in place of the first electromagnetic valve 60 and the second electromagnetic valve 65 of the first embodiment. The same components as the first embodiment are given the same reference signs, and description thereof will be omitted.

Figure 8:
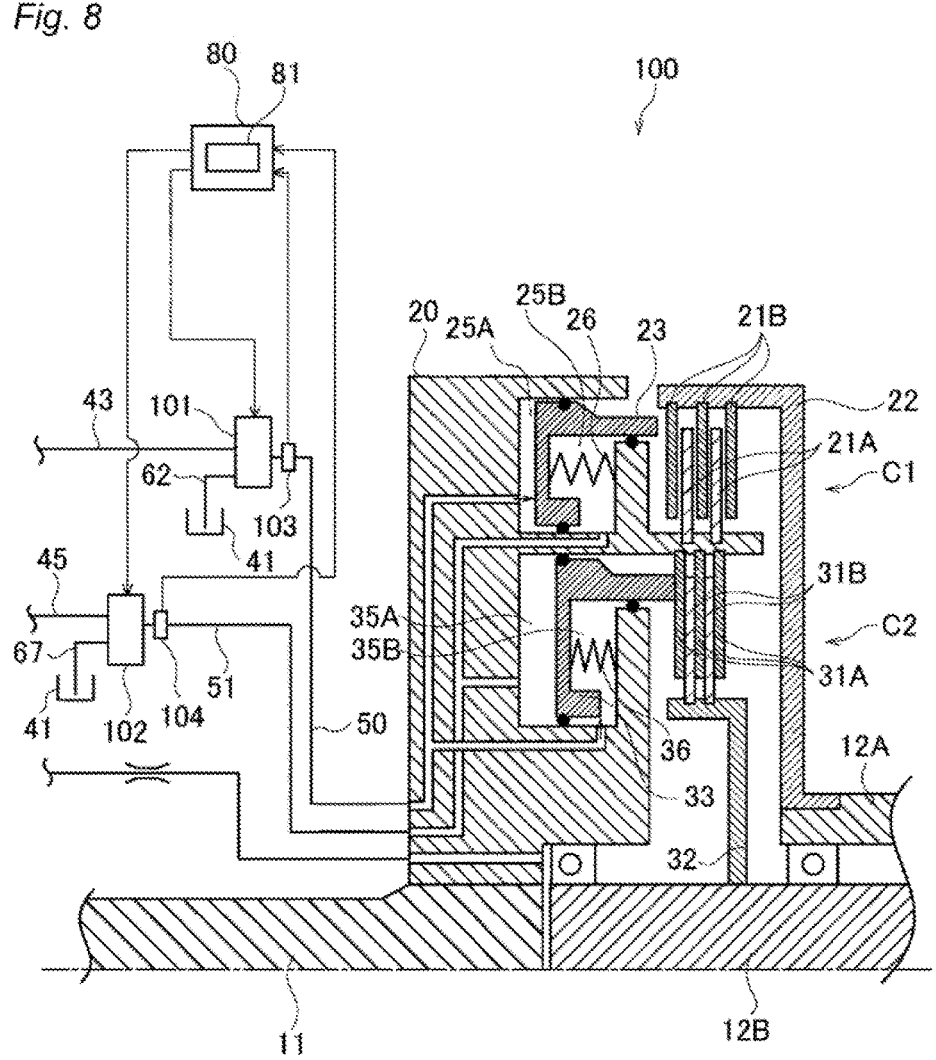
FIG. 8 is a schematic longitudinal sectional view illustrating an upper half of a dual clutch apparatus according to a third embodiment

As illustrated in FIG. 8, the dual clutch apparatus 100 is provided with a first hydraulic pressure regulation valve (a first valve) 101 that is connected to a first upstream supply line 43 and a first downstream supply line 50, a first hydraulic pressure sensor 103 that is provided for the first downstream supply line 50, a second hydraulic pressure regulation valve (a second valve) 102 that is connected to a second upstream supply line 45 and a second downstream supply line 51, and a second hydraulic pressure sensor 104 that is provided for the second downstream supply line 51.

The first hydraulic pressure regulation valve 101 can adjust a hydraulic pressure that is supplied to a first hydraulic chamber 25A and a second centrifugal hydraulic canceling chamber 35B via the first downstream supply line 50. When the first hydraulic pressure regulation valve 101 is opened (ON), pressure oil is supplied to the first hydraulic chamber 25A and the second centrifugal hydraulic canceling chamber 35B. On the other hand, when the first hydraulic pressure regulation valve 101 is closed (OFF), no pressure oil is supplied to the first hydraulic chamber 25A and the second centrifugal hydraulic canceling chamber 35B, and the pressure oil inside the first hydraulic chamber 25A and the second centrifugal hydraulic canceling chamber 35S returns to an oil pan 41 via an oil return line 62.

The second hydraulic pressure regulation valve 102 can adjust a hydraulic pressure that is supplied to a second hydraulic chamber 35A and a first centrifugal hydraulic canceling chamber 25B via the second downstream supply line 51. When the second hydraulic pressure regulation valve 102 is opened (ON), pressure oil is supplied to the second hydraulic chamber 35A and the first centrifugal hydraulic canceling chamber 25B. On the other hand, when the second hydraulic pressure regulation valve 102 is closed (OFF), no pressure oil is supplied to the second hydraulic chamber 35A and the first centrifugal hydraulic canceling chamber 25B, and the pressure oil inside the second hydraulic chamber 35A and the first centrifugal hydraulic canceling chamber 25B returns to the oil pan 41 via an oil return line 67.

The first hydraulic pressure sensor 103 detects the hydraulic pressure of the first downstream supply line 50, and sequentially outputs it to an ECU 80. The second hydraulic pressure sensor 104 detects the hydraulic pressure of the second downstream supply line 51, and sequentially outputs it to the ECU 80.

When a change from a second clutch connected state (a clutch connected state, see FIG. 8). In which a second wet clutch C2 is connected by turning OFF the first (or the other) hydraulic pressure regulation valve 101 and turning ON the second (or the one) hydraulic pressure regulation valve 102, to a two-clutch disconnected state (see FIG. 9), in which the second wet clutch C2 is disconnected, is performed, a valve control part 81 of the ECU 80 turns OFF the second hydraulic pressure regulation valve 102 and nearly simultaneously turns ON the first hydraulic pressure regulation valve 101. When the valve control part 81 turns ON the first hydraulic pressure regulation valve 101, the valve control part 81 controls the first hydraulic pressure regulation valve 101 such, that the hydraulic pressure of the first downstream supply line 50 which is detected by the first hydraulic pressure sensor 103 becomes a given hydraulic pressure.

Figure 9:
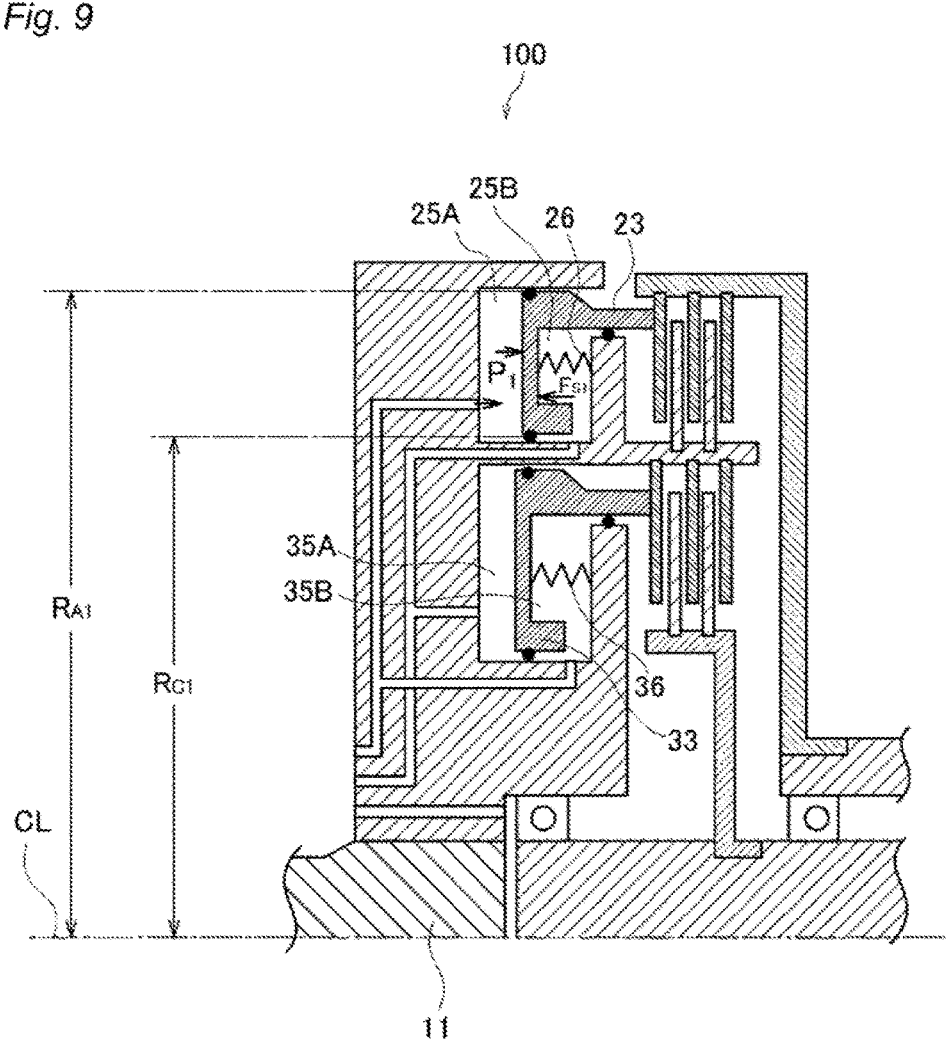
FIG. 9 is a view illustrating hydraulic pressure acting on a first piston and a biasing force of a first return spring in the dual clutch apparatus according to the third embodiment.

A value obtained when oil pressure acting on a first piston 23 from the first hydraulic chamber 25A side when the first hydraulic pressure regulation, valve 101 is opened is made smaller than a biasing force of a first return spring 26 is set as the given hydraulic pressure. Fox example, in the dual clutch apparatus 100 of FIG. 9, the given hydraulic pressure is set to meet Conditional Expression (3) below. In FIG. 9, RA1 indicates an outer diameter of the first piston 23, RC1 indicates an inner diameter of the first piston 23, P1 indicates the hydraulic pressure, and FS1 indicates the biasing force of the first return spring 26. Both the outer diameter and the inner diameter represent radii from an axis CL of rotation.

[Expression 3]

$$F_{S1}/((R_{A1}^2 - R_{C1}^2)\cdot\pi) > P_1 \qquad (3)$$

A conditional expression for obtaining the given hydraulic pressure is not limited to Conditional Expression (3) above. For example, when a shape of the first piston is another shape, the conditional expression may be another conditional expression.

In the dual clutch apparatus 100 configured as described above, when the second clutch connected state (see FIG. 8) is changed to the two-clutch disconnected state (see FIG. 9), the second hydraulic pressure regulation valve 102 is turned OFF, and nearly simultaneously the first hydraulic pressure regulation valve 101 is turned ON. Since the hydraulic pressure supplied, to the first hydraulic chamber 25A (and the second centrifugal hydraulic canceling chamber 35B) by turning ON the first hydraulic pressure regulation valve 101 is the given hydraulic pressure set previously, the oil pressure acting on the first piston 23 is smaller than the biasing force of the first return spring 26. For this reason, even when the first hydraulic pressure regulation valve 101 is turned ON, the first piston 23 does not move in a direction in which the first wet clutch C1 is connected. Since the hydraulic pressure is supplied to the second centrifugal hydraulic canceling chamber 35B by aiming ON the first hydraulic pressure regulation valve 101, a second piston 33 moves away from each of second plates 31A and 31B due to the oil pressure acting from the second centrifugal hydraulic canceling chamber 35B side in addition to the biasing force of the second return spring 36, releases the pressure-connected state, and the second wet clutch C2 is disconnected. Accordingly, the clutch connected state can be reliably changed to the two-clutch disconnected state, and responsiveness of the second piston 33 when the second wet clutch C2 is disconnected can be improved.

After a sleeve is moved in the two-clutch disconnected state, when the first wet clutch C1 is connected, the valve control part 81 may control the first hydraulic pressure regulation valve 101 such that the hydraulic pressure supplied to the first hydraulic chamber 25A and the second centrifugal hydraulic canceling chamber 35B via the first downstream supply line 50 is increased from the given hydraulic pressure.

While the present invention has been described on the basis of the embodiments, the present invention is not limited to the contents of the embodiments, and can also be appropriately modified without departing from the present invention. That is, it goes without saying that other embodiments, examples, and operating techniques carried out by those skilled in the art on the basis of this embodiment are included, in the scope of the present invention.

For example, in the embodiments, the dual clutch apparatus 10, 90 or 100 is connected to the dual clutch type transmission 1 illustrated in FIGS. 1 and 2, but may be connected to a dual clutch type transmission with another structure. For example, the dual clutch type transmission 1 may be a dual clutch type transmission in which the first wet clutch C1 corresponds to the even numbered stages and the second wet clutch C2 corresponds to the odd numbered stages.

DESCRIPTION OF REFERENCE NUMERALS AND CHARACTERS

10, 90, 100: dual clutch apparatus
11: clutch input shaft
12A: first transmission input shaft
12B: second transmission input shaft
20: clutch hub
21A: first inner plate (first plate)
21B: first outer plate (first plate)
23: first piston
25A: first hydraulic chamber
25B: first centrifugal hydraulic canceling chamber (first hydraulic canceling chamber)
26: first return spring (first spring)
31A: second outer plate (second plate)
31B: second inner plate (second plate)
33: second piston
35A: second hydraulic chamber
35B: second centrifugal hydraulic canceling chamber (second hydraulic canceling chamber)
36: second return spring (second spring)
40: hydraulic pressure circuit
43: first upstream supply line (first supply line)
45: second upstream supply line (second supply line)
50: first downstream supply line (first supply line)
50A: first hydraulic chamber-purpose line
50B: second canceling chamber-purpose line
51: second downstream supply line (second supply line)
51A: second hydraulic chamber-purpose line
51B: first canceling chamber-purpose line
60: first electromagnetic valve (first valve)
65: second electromagnetic valve (second valve)
80: electronic control unit (valve control unit, time counting unit)
81: valve control part (valve control trait)
82: time counting part (time counting unit)
91: rotating speed sensor (rotating speed detecting unit)
101: first hydraulic pressure regulation valve (first valve)
102: second hydraulic pressure regulation valve (second valve)

The invention claimed is:

1. A dual clutch apparatus provided with a first clinch having first plates that connect and disconnect power transmission from an engine to a first transmission input shaft and a second clutch having second plates that connect and disconnect power transmission from the engine to a second transmission input shaft, the dual clutch apparatus comprising:
  a first piston configured to press the first plates together to connect the first clutch by a hydraulic pressure supplied into a first hydraulic chamber and to separate the first plates to disconnect the first clutch by a first spring housed in a first hydraulic canceling chamber;
  a second piston configured to press the second plates together to connect the second clutch by a hydraulic pressure supplied into a second hydraulic chamber and to separate the second plates to disconnect the second clutch by a second spring housed in a second hydraulic canceling chamber;

a first supply line configured to supply the hydraulic pressure to the first hydraulic chamber and the second hydraulic canceling chamber;

a second supply line configured to supply the hydraulic pressure to the second hydraulic chamber and the first hydraulic canceling chamber;

a first valve installed in the first supply line and configured to allow or block supply of the hydraulic pressure to the first hydraulic chamber and the second hydraulic canceling chamber;

a second valve installed in the second supply line and configured to allow or block supply of the hydraulic pressure to the second hydraulic chamber and the first hydraulic canceling chamber; and a valve control unit that controls the first valve and the second valve, wherein, when a clutch connected state, in which one of the first valve and the second valve is opened to connect one of the first clutch and the second clutch and the other valve is closed to disconnect the other clutch, is changed to a two-clutch disconnected state, in which the first valve and the second valve are closed to disconnect the first clutch and the second clutch, the valve control unit closes the one valve and opens the other valve, and then closes the other valve before the other clutch is connected.

2. The dual clutch apparatus according to claim 1 further comprising:

a time counting unit that counts at least one of an elapsed time after the one valve is closed and an elapsed time after the other valve is opened, wherein, when the clutch connected state is changed to the two-clutch disconnected state, the valve control unit closes the one valve and opens the other valve, and then determines, based on the elapsed time counted by the time counting unit, whether or not it is before the other clutch is connected.

3. The dual clutch apparatus according to claim 1 further comprising:

a rotating speed detecting unit that detects a rotating speed of one of the two transmission input shafts to which power from the engine is transmitted via the one clutch, wherein, when the clutch connected state is changed to the two-clutch disconnected state, the valve control unit closes the one valve and opens the other valve, and then determines, based on the rotating speed detected by the rotating speed detecting unit, whether or not the one clutch is disconnected, and closes the other valve when it is determined that the one clutch is disconnected.

4. A dual clinch apparatus provided with a first clutch having first plates that connect and disconnect power transmission from an engine to a first transmission input shaft and a second clutch having second plates that connect and disconnect power transmission from the engine to a second transmission input shaft, the dual clutch apparatus comprising:

a first piston configured to press the first plates together to connect the first clutch by a hydraulic pressure supplied into a first hydraulic chamber and to separate the first plates to disconnect the first clutch by a first spring housed in a first hydraulic canceling chamber;

a second piston configured to press the second plates together to connect the second clutch by a hydraulic pressure supplied into a second hydraulic chamber and to separate the second plates to disconnect the second clutch by a second spring housed in a second hydraulic canceling chamber;

a first supply line configured to supply the hydraulic pressure to the first hydraulic chamber and the second hydraulic canceling chamber;

a second supply line configured to supply the hydraulic pressure to the second hydraulic chamber and the first hydraulic canceling chamber;

a first valve installed in the first supply line and configured to adjust the hydraulic pressure to be supplied to the first hydraulic chamber and the second hydraulic canceling chamber;

a second valve installed in the second supply line and configured to adjust the hydraulic pressure to be supplied to the second hydraulic chamber and the first hydraulic canceling chamber; and a valve control unit that controls the first valve and the second valve, wherein, when a clutch connected state, in which one of the first valve and the second valve is opened to connect one of the first clutch and the second clutch and the other valve is closed to disconnect the other clutch, is changed to a two-clutch disconnected state in which the two valves are closed to disconnect the first clutch and the second clutch, the valve control unit opens the other valve such that oil pressure smaller than a biasing force of the other spring disconnecting the other clutch acts on the other piston connecting and disconnecting the other clutch from the other hydraulic chamber side, and closes the one valve.

* * * * *